May 7, 1963  M. DEAN III  3,089,107
WATERPROOFING STRAIN GAGES
Filed April 14, 1961

INVENTOR
MILLS DEAN III

BY
ATTORNEYS

United States Patent Office 3,089,107
Patented May 7, 1963

3,089,107
WATERPROOFING STRAIN GAGES
Mills Dean III, McLean, Va., assignor to the United States of America as represented by the Secretary of the Navy
Filed Apr. 14, 1961, Ser. No. 103,698
6 Claims. (Cl. 338—2)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of patent application Serial No. 847,852, filed October 21, 1959, now abandoned, which in turn is a continuation-in-part of patent application Serial No. 470,144 filed November 19, 1954, now abandoned.

The invention relates, broadly, to improvements in the mounting and waterproofing of electric bonded wire resistance strain gages of the type which can be cemented to a surface so that deformation of the surface will change the resistance of the gage.

In the application of the above resistance gages to Naval testing procedures several problems are at once presented. It is frequently important that the gage be mounted on a test model which will be submerged under salt water for prolonged periods of time. It is also necessary in the recording of underwater shock conditions that no physical damage be imparted to the gage. If strain gages are to be mounted on the outside hull plating of full-scale ships for testing for and determining strains therein, such as for seaway slamming studies, it is important that the electrical strain gages be protected from washing away. Equally important is that the waterproofing should provide as smooth a hydrodynamic surface as possible for minimal disturbance to water flow over the test section if any. In the prior art various coatings have been applied to the gage for the purpose of mechanical strength and waterproofing but none has proved satisfactory hitherto.

It is a broad object, therefore, of the invention to provide a waterproofing assembly including a strain gage for application to a wide variety of testing conditions. The waterproofing and mechanical protection concepts covered in the broad object of this invention permits application of one or more strain gages to a wide variety of surface contours and locations.

Another object of the invention is the provision of a method of waterproofing a wire resistance strain gage in any location.

Other objects and many of the attendant advantages of this invention will be readily appreciated as the same becomes better understood by reference to the following detailed description when considered in connection with the accompanying drawings wherein.

Figure 1:
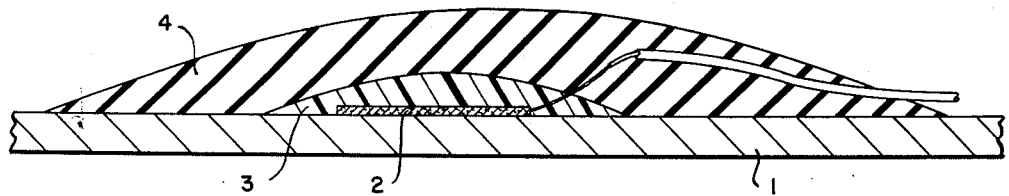
FIG. 1 is a cross-section view of a novel waterproof strain gage, in accordance with the instant invention.

In FIG. 1 of the drawing, which for the purpose of illustration shows a preferred embodiment of the invention, and wherein like reference characters denote corresponding parts throughout, reference character 1 indicates the metal specimen under test. The strain gage 2 comprises a filament of a material of good strain sensitive electrical conductivity suitably bonded or cemented to the specimen. A layer of soft wax 3 is provided for use on paper base gages as will be later explained. Reference character 4 denotes an outer protective covering of any suitable synthetic rubber that quickly cures after application.

Figure 2:
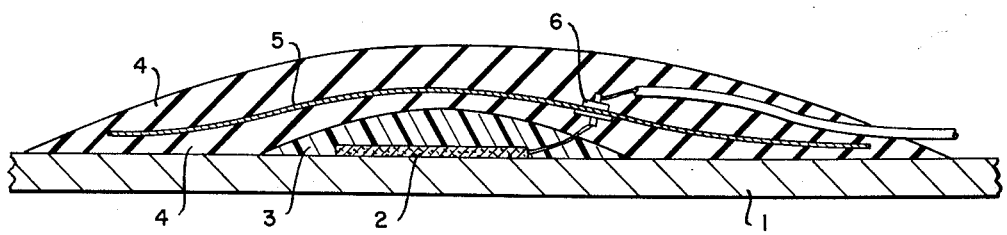
FIG. 2 is a cross-section view of another species of the strain gage illustrated in FIG. 1.

In FIG. 2, the preferred embodiment, reference character 1 indicates the metal specimen; reference character 2 denotes the strain gage; reference character 3 denotes an optional layer of wax to be used on a paper back gage, and 5 indicates a stainless steel shim preferably one or two thousandths of an inch in thickness. In order to properly pass the conductors from the gage through the shim, a plurality of glass bead electrical feed-throughs 6 are provided only one of which is shown. It will be noted that the steel plate is disposed in spaced relation with the layer of wax and gage. When the protective covering of synthetic rubber 4 is applied as a paste, the volume formed between the plate and the gage or wax will be filled with such material.

Gages have been successfully waterproofed and sealed in several critical test installations in accordance with the above described species. A three-component balance was constrained to operate under water where the sealing area around each gage was less than ⅛ of an inch. The method was successfully used on a whip antenna on a submarine at sea, and the method was successfully practiced on the exposed surface of underwater bodies subjected to free flow of both salt and fresh water at velocities up to 50 knots.

Gages have been mounted and waterproofed on steel, aluminum and other materials. For one application the waterproofing seal over the gage had to be built up to a thickness of ⅛ inch and tapered to a feather edge so as not to disrupt the flow of water over the test section. In other words, the seal was streamlined or hydrodynamically shaped. In this application the waterproofing combined three functions:

(1) It waterproofed the gages
(2) It fixed and embedded the connecting wires
(3) It prevented the entire gage and wiring installation from being torn away from the placement by the flow of water.

In still other tests, gages have been mounted on steel test strips, waterproofed, and then subjected to hydrostatic pressures of 1,000 p.s.i. for as long as 2½ months. Electrical resistance was still small enough to be acceptable. The electrical leakage through about 25 megohms and below is considered unsatisfactory. The electrical leakage paths which were initially of the order of 10,000 megohms dropped not lower than 100 megohms when no metal primer was used. Other test strips which were primed had a final leakage path of 150 to 700 megohms. Similar tests have been made with the gage specimen subjected to hydrodynamic shock pressures from underwater explosions. Fast rising peak pressures of 2,000 to 5,000 p.s.i. from these explosions failed to rupture or tear loose the coating or to change the gage leakage reading.

The first step in my novel method of waterproofing a gage is to insure that all gage surfaces and surrounding areas and connecting wires are free from grease, oil, fingerprints, etc. Acetone or a similar solvent can be used for cleaning such areas. Excess cement on the metal around the gage must be removed. As previously mentioned, paper base gages will be prepared for waterproofing by applying a thin coating of wax or a similar compound over the gage body and any surrounding cement. Beeswax has been found satisfactory. This is to prevent the rubber compound which is later applied from coming into direct contact with the gage or the bonding cement since it has been found that there is a chemical reaction which tends to lower the final electrical gage leakage resistance. This layer of wax is unnecessary for Bakelite gages.

A metal primer is next applied when required to the exposed metal around the wax. A suitable primer is EC-853, manufactured by the Minnesota Mining and Manufacturing Company, which is dissolved in an organic solvent. The primer is allowed to dry just prior to the application of the synthetic rubber.

A synthetic rubber mixture is next applied as a layer over the wax layer, with border portions of the rubber contacting and bonding to the metal around the wax layer. The rubber is preferable, of the self-curing and self-vulcanizing type, and is applied as a paste. It becomes hardened, firm and tack-free after curing. Any suitable primer, where desirable, and any suitable self-curing or setting synthetic rubber with adhesion-to-metal properties may be used.

Suitable mixtures that are applied as pastes are synthetic rubbers, either type EC–801 or EC–864 as a base, which are liquid organic polysulfide polymers containing carbon black mixed with an accelerator or catalyst, such as EC–807, in the proportion of 10 parts of base to one part of accelerator by weight. The above mentioned accelerator is a lead peroxide catalyst composition dissolved in an organic solvent. Type EC–864 is the more viscous of the two synthetic rubbers and lends itself to the application of thicker coatings on selected areas. The mixture is applied as a paste and built up to the desired thickness, at least ⅛ inch. After application the surface becomes firm and tack-free in about twelve hours and completely cured in 24 to 36 hours at room temperature. The curing reaction can be speeded up by application of mild heat (120° to 140° F.). Air contact is not required for curing since this is a chemical reaction.

When the above described waterproofing is built up to a nominal thickness, it does not introduce observable stiffness to the flexure in a sample which is to be responsive to bending. The coating, further, does not take up space to the extent that there is physical interference between adjacent flexures. The coating is also readily shaped and provides a void-free protective assembly. The compound however protects the electrical circuit from water and the development of any short circuiting leakage path between the gage element and a metal sample. The coating compound resulting from the use of EC–864 may be feathered and tapered by abrasive sanding to provide a streamline or hydrodynamical smooth outer surface, as indicated in FIGS. 1 and 2.

When strain gage test instrumentation is to be applied to the outside hull and used below the waterline of a full-scale ship, they are mounted during dry dock periods. After undocking, such gages which are protected and waterproofed in accordance with FIG. 2 will function successfully even though subjected to large hydrostatic pressures and turbulant waterflow.

The above-mentioned materials EC–801, etc. are available from the Minnesota Mining and Manufacturing Company which has bulletins describing them. These materials were used for the tests described above. Other materials of similar characteristics are also available commercially.

Obviously many modifications and variations of the present invention are possible in the light of the above teachings. It is therefore to be understood that within the scope of the appended claims the invention may be practiced otherwise than as specifically described.

What is claimed is:

1. A method of applying a flat, wire-resistance-type strain gage to metal to be stressed, the strain gage having insulated electrical conductors extending therefrom, which method comprises cleaning the metal surface, laying the straing gage flatwise on the metal surface, covering the strain gage with wax with the conductors passing through the wax, covering the wax with a pasty layer of self-curing waterproof synthetic rubber with the conductors passing through the rubber, placing a metal shim larger than the strain gage on the layer of synthetic rubber so that the edges of the metal piece overlie the wax and the strain gage but are short of the edges of said rubber layer, and then applying another layer of self-curing synthetic rubber over said metal piece and the first said layer, with said conductors passing through the last said layer.

2. A method of applying a flat, wire-resistance-type strain gage to metal to be stressed, the strain gage having insulated electrical conductors extending therefrom, which method comprises cleaning the metal surface, cementing the strain gage flatwise on the metal surface, covering the strain gage with wax, applying a primer to the area of the metal around the wax cover, covering the wax with a pasty layer of self-curing waterproof synthetic rubber, placing a piece of metal larger than the strain gage on the layer of synthetic rubber so that the edges of the metal-piece overlie the wax and the strain gage but are short of the edges of said rubber layer, and then applying another layer of self-curing synthetic rubber over said metal piece and the first said layer, the aforesaid coverings being such that said conductors pass through the coverings.

3. An assembly for measuring strain in an area of metal, comprising a flat wire-resistance-type strain gage cemented to the metal at said area, said strain gage comprising a pair of insulated electrical conductors extending therefrom, a layer of wax covering said strain gage, and extending beyond its edges, a relatively thin metal plate disposed in spaced relation with said layer of wax and extending beyond the edges of the strain gage, and an outer layer of synthetic rubber intimately and protectively covering said plate and filling the space formed between said wax and said plate, said layer of synthetic rubber having border portions extending beyond said wax layer and bonded to the metal, said conductors extending through said outer layers.

4. An assembly as defined in claim 3, but including a plurality of glass bead connectors piercing the said plate, each said connector adapted to receive one of said conductors.

5. An assembly as defined in claim 3, wherein said synthetic rubber is a cured product cured in the assembly and has its outer surface streamlined.

6. An electrical wire resistance strain gage for use in measuring strain in a metal body and comprising a filament material of good electrical conductivity, a non-electrical conducting layer of cement adhesively holding said filament material to said body, a layer of soft wax covering said filament material, a relatively thin metal layer disposed in spaced relation with said layer of wax, a protective layer of synthetic rubber intimately and protectively covering said metal layer and filling the space provided between said wax and the adjacent surface of said plate, and a non-corrodible metal shim disposed between the layer of synthetic rubber and the metal layer.

References Cited in the file of this patent

UNITED STATES PATENTS

| | | |
|---|---|---|
| 2,363,181 | Howland | Nov. 21, 1944 |
| 2,423,842 | McHenry | July 15, 1947 |
| 2,428,433 | Roy | Oct. 7, 1947 |
| 2,466,963 | Patrick et al. | Apr. 12, 1949 |
| 2,536,101 | Shoub | Jan. 2, 1951 |

FOREIGN PATENTS

| | | |
|---|---|---|
| 138,683 | Austria | July 3, 1947 |